United States Patent [19]
Aiello et al.

[11] Patent Number: 5,965,966
[45] Date of Patent: Oct. 12, 1999

[54] STATOR GROUNDING MEANS BASED ON RADIAL INTERFERENCE

[75] Inventors: Anthony Joseph Aiello, Santa Cruz; Alan Lyndon Grantz, Aptos, both of Calif.

[73] Assignee: Seagate Technology, Inc., Scotts Valley, Calif.

[21] Appl. No.: 09/022,644

[22] Filed: Feb. 12, 1998

[51] Int. Cl.[6] .......................... H01R 39/08; H02K 13/00
[52] U.S. Cl. ................. 310/232; 310/43; 310/51; 310/67 R; 310/71; 310/217; 310/254; 310/258
[58] Field of Search .................... 310/67 R, 51, 310/71, 217, 43, 232, 254, 258

[56] References Cited

U.S. PATENT DOCUMENTS

| | | | |
|---|---|---|---|
| 4,777,459 | 10/1998 | Dushkes et al. | 360/97 |
| 5,376,850 | 12/1994 | Elsing et al. | 310/67 R |
| 5,493,462 | 2/1996 | Peter | 360/99.12 |
| 5,497,281 | 3/1996 | Jewell et al. | 360/98.08 |
| 5,815,345 | 9/1998 | Pelstring et al. | 360/99.08 |
| 5,844,748 | 12/1998 | Dunfield et al. | 360/99.08 |
| 5,847,476 | 12/1998 | Elsing et al. | 310/51 |

*Primary Examiner*—Elvin G. Enad
*Attorney, Agent, or Firm*—Flehr, Hohbach, Test, Albritton & Herbert LLP

[57] ABSTRACT

An improved spindle motor design of a type especially for use in a disc drive is disclosed, which provides a simplified design for installation of the stator over the shaft, and should especially locate the stack both radially and axially in a specific location relative to the shaft so that its location relative to the surrounding, rotating parts of the motor is fixed. In addition, the improved spindle motor design fixes the stack on the shaft through radial interference, eliminating the need for adhesive to fix the stator to the shaft. Also, the design minimizes the cost of assembling the stack on the shaft, isolates the stack and shaft from conveying vibration one to the other, and electrically grounds the stack to the shaft.

10 Claims, 5 Drawing Sheets

STATOR GROUNDING MEANS BASED ON RADIAL INTERFERENCE

CROSS-REFERENCE TO RELATED APPLICATIONS

The subject invention is useful in the motor described in U.S. patent application, Ser. No. 08/974,277 filed Nov. 19, 1997, entitled "SPINDLE MOTOR WITH TWO PIECE SHAFT AND CONNECTOR" by Grantz, et al., assigned to the assignee of the present application and incorporated herein by reference. Of course, the invention and the concepts underlying the invention are also useful in many other motor designs, and this invention is not to be limited to use with the specific motor design shown in the incorporated application or the drawings to be described below.

FIELD OF THE INVENTION

This invention is directed generally to the field of disc drives, and more particularly, to an improved assembly for the spindle motor of a disc drive.

BACKGROUND OF THE INVENTION

Winchester disc drives are used in computers to store increasingly large amounts of information. A typical Winchester disc drive is a system with a limited number of mechanical parts, including a spindle motor which mounts one or more discs for constant speed rotation, and an actuator carrying a transducer at one end and a voice coil motor at the other, and operable in response to commands to the voice coil motor to position the transducer over a selected track on a disc to read and write data.

As one of the most expensive elements of the disc drive, as well as one of the largest and most mechanically complex, many design efforts are intended to minimize the cost and ease of assembly of the spindle motor. This particular invention is especially directed to improving spindle motor design to incorporate means for centering the stator stack on the shaft so that it is properly aligned with the magnet supported on the hub rotating outside the stator. The hub then remains properly centered over the shaft and stator without the creation of any undesirable axial or radial torque, also the maximum rotational torque is established between stator and rotating hub.

A further problem intended to be addressed in the design would be to eliminate the need for adhesive bonding between the stator and the shaft on which it is mounted. A related problem which it is also desirable to address is to provide an effective electrical grounding path between the stator and the shaft,

SUMMARY OF THE INVENTION

Therefore it is an object of the present invention to provide an improved spindle motor design of a type especially for use in a disc drive.

A related and more specific objective of the invention is to provide a simplified design for installation of the stator over the shaft. The design should especially locate the stack both radially and axially relative to the shaft so that its location relative to the surrounding, rotating parts of the motor is fixed.

A further objective of the invention is to provide means and method to fix the stack on the shaft through radial interference, eliminating the need for adhesive to fix the stator to the shaft.

Yet another objective of the invention is to minimize the cost of assembling the stack on the shaft.

Yet another objective is to isolate the stack and shaft from conveying vibration one to the other, while still electrically grounding the stator to the shaft.

These and other objectives of the invention are provided in a spindle motor incorporating a shaft having a known outer diameter and a stator having a fixed inner diameter which is slightly larger than the outer diameter of the shaft so that it may slip over the shaft. A clip is provided which may either be flexible so that it can be pressed over the shaft, or have a hinged center section so that it may be opened and closed over the shaft. The clip is axially fixed in place by resting on a shoulder defined on the shaft or on an internal race of the bearings which rest on the shaft. The clip preferably includes at least three radial upsets on its outer surface which engage the inner diameter of the stator stack and create an interference fit between the shaft, the clip, and the stator stack. In this way, the position of the stator stack is fixed both radially and axially. Preferably, the radial upsets on the surface of the clip have relatively sharp edges so that they cut through the interior plastic coating of the stator stack, providing an electrical connection to ground the stator stack to the shaft. The clip may also include a defined shoulder (metal or plastic) against which one axial edge of the stator stack rests to further accurately axially align the stator on the shaft.

Other features and advantages of the present invention will be better understood by reference to the following figures, and the detailed description of exemplary embodiments given in conjunction with these figures.

DETAILED DESCRIPTION OF THE PREFERRED EMBODIMENTS

Figure 1:
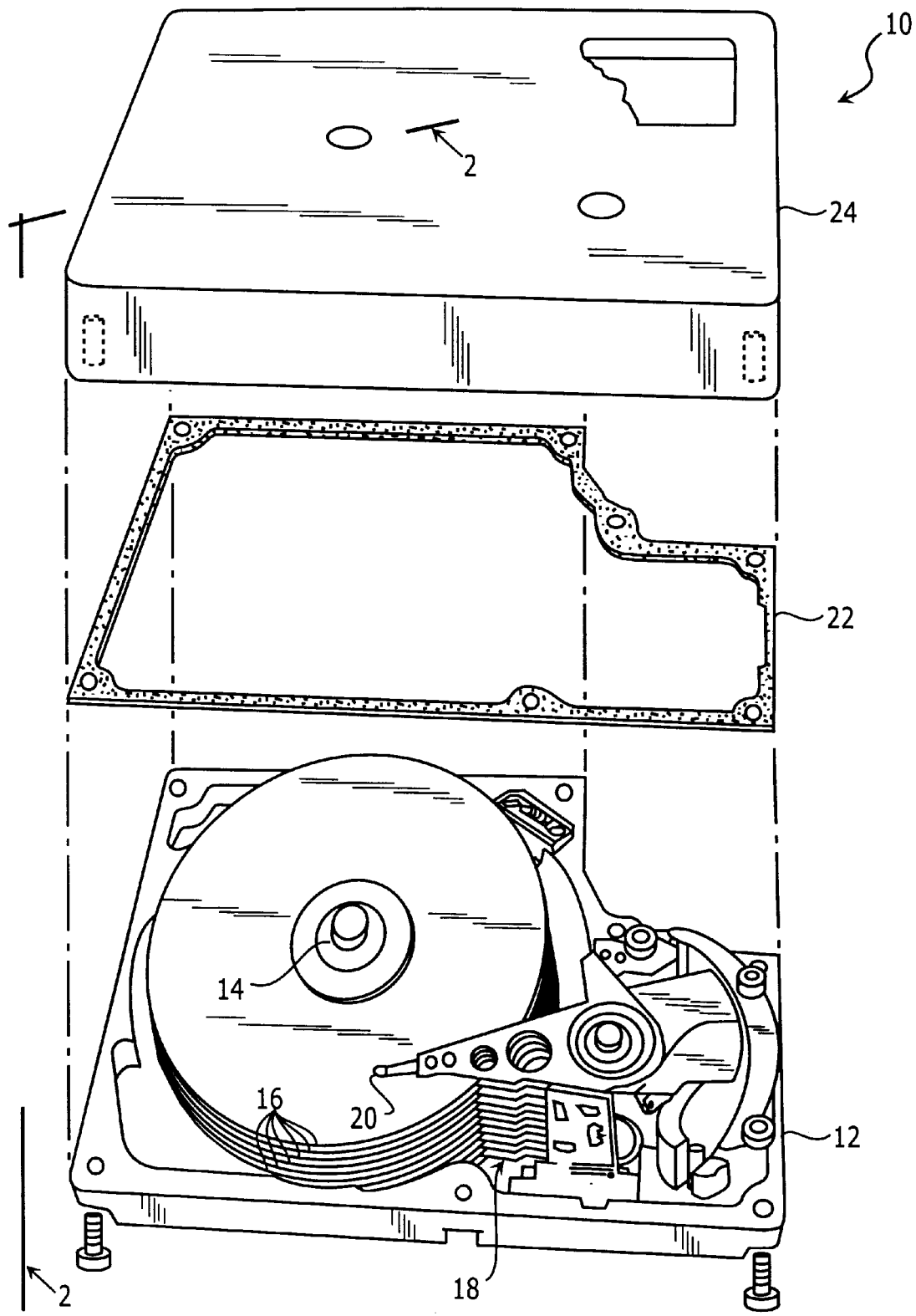
FIG. 1 is a plan view of a disc drive in which the present spindle motor with attachment grounding clip is useful.

FIG. 1 is an exploded perspective view of a magnetic disc drive storage system in which the present motor and grounding attachment clip could be used. However, clearly this clip is not limited to use with a particular design of motor, nor is it limited for use only with spindle motors used in disc drives. Rather, given the many advantages the invention achieves, it could be useful in many motor designs where the accurate radial and axial alignment of a stator mounted onto a shaft, vibration isolation between the stator and shaft, and electrical grounding of the stack to the shaft are critical features.

In this particular example of FIG. 1, the storage system 10 includes a housing base 12 having a spindle motor 14 which carries storage discs 16. Armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers to read and write mathematically encoded information on the surface of discs 16 at selected locations. The discs rotate at very high speeds, several thousand RPM, in order to maintain the transducers flying over the surface of the discs. In present day technology, the spacing distance between the transducer and the rotating disc surface is measured in micro inches; thus it is absolutely essential that the spindle motor be reliable in operation in terms of maintaining consistent speed of operation while not being susceptible to vibration or misalignment.

Figure 2:
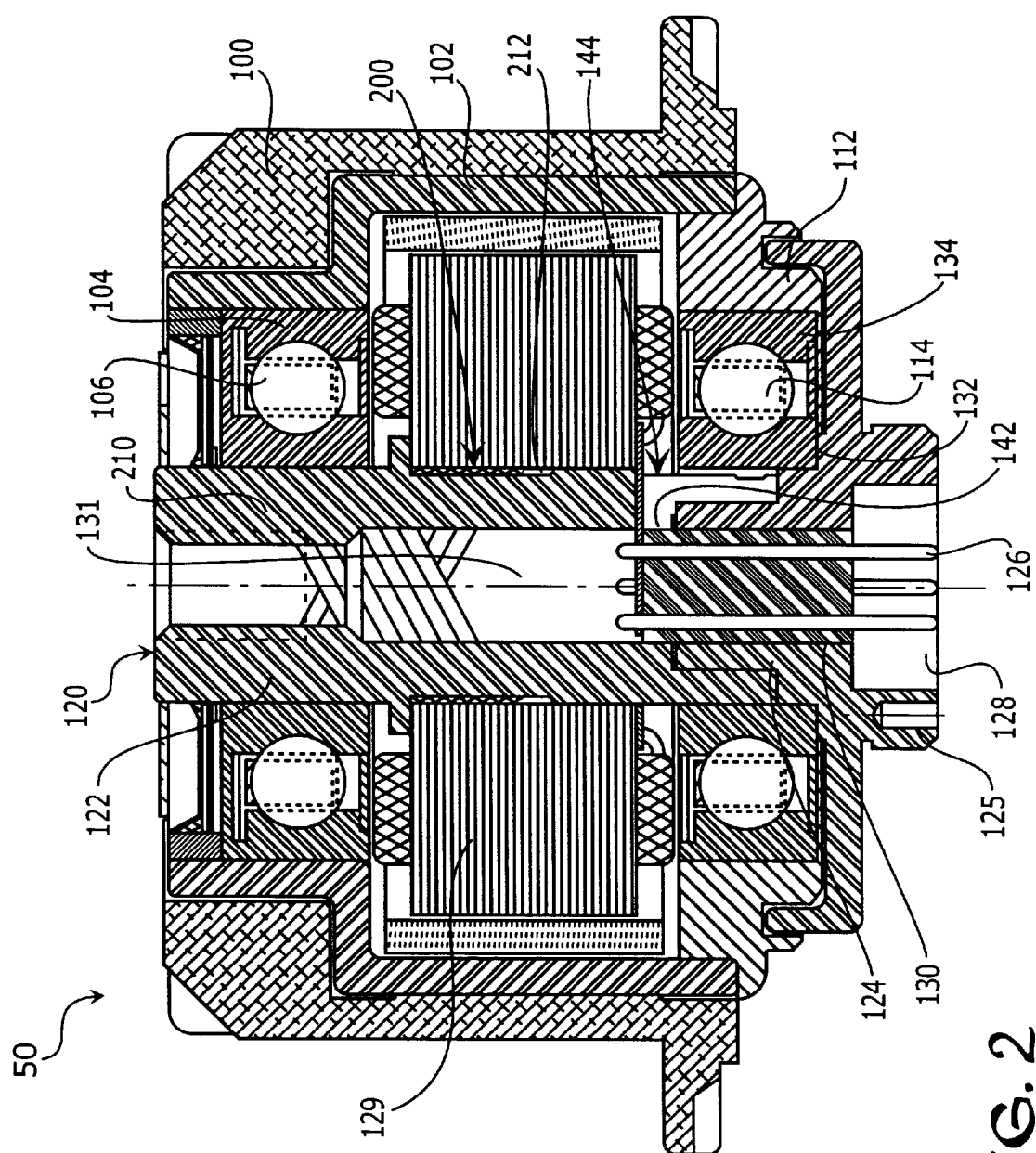
FIG. 2 is a vertical sectional view of a spindle motor design in accordance with the present invention showing a grounding clip in place between the shaft and the stator.

Referring next to FIG. 2, the figure shows the primary pieces of an exemplary motor in which one embodiment of the present invention is used to mount the stator to the shaft. As shown, the motor 50 supports a hub 100 with a backiron 102 which are supported for rotation from the outer race 104 of the upper bearing 106 and the outer race 112 of the lower bearing 114. The figure further shows a two piece shaft generally indicated at 120 comprising an upper section 122 which overlaps a lower section 124 to form an integrated, stationary shaft. The shaft includes a threaded flange 125 on its lower section 124 so that it may easily be incorporated into the base section of a disc drive housing such as shown in FIG. 1. A three pin connector generally indicated at 126 protrudes from a recess 128 in the lower section 124 of the shaft so that an AC power supply connection from an external power source can be provided. Extensions of the three pin connector extend from the top of the connector and contact a means for providing a connection to the stator 129.

The lower shaft section 124 incorporates a cylindrical section 130 which defines the cavity or a portion of the cavity 131 in which the connector is located. This lower shaft section also includes a shoulder 132 which is used to locate the inner race 134 of the lower bearing. The shaft 120 includes a cutout region 142 so that a flexible printed circuit connector generally indicated at 144 can pass from the stator 129 to the connector pins 126.

Figure 3A:
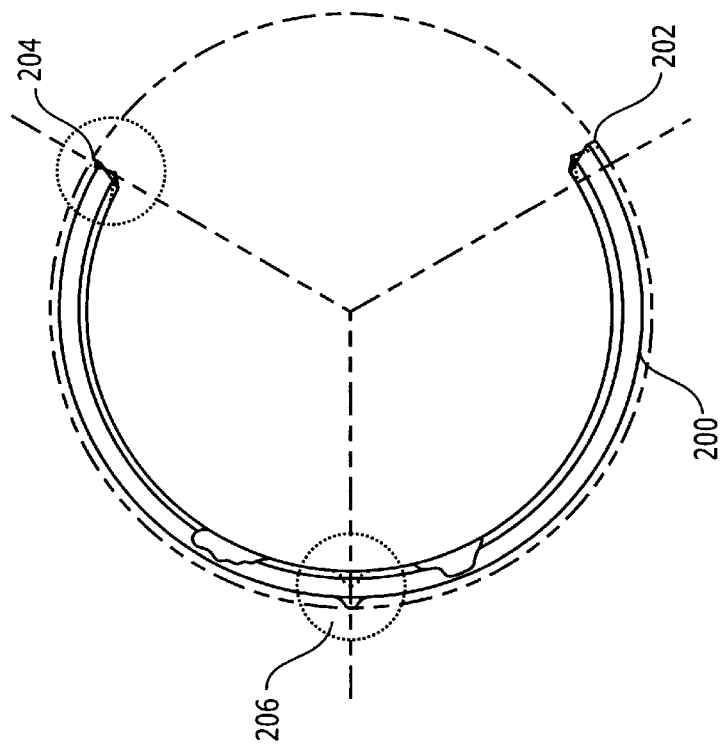
FIGS. 3A–3D are plan and elevation views of details of the grounding clip.
Figure 3B:
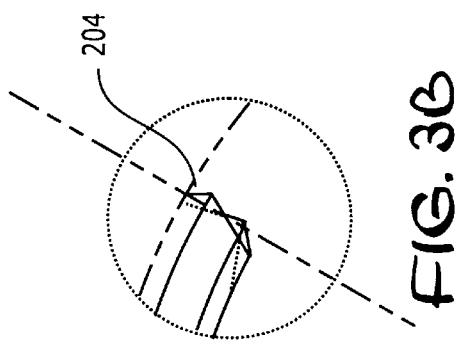
Figure 3C:
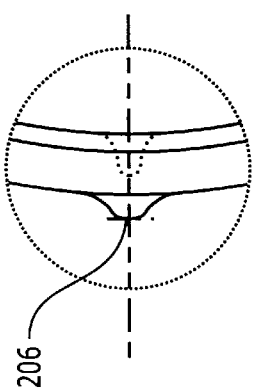
Figure 3D:
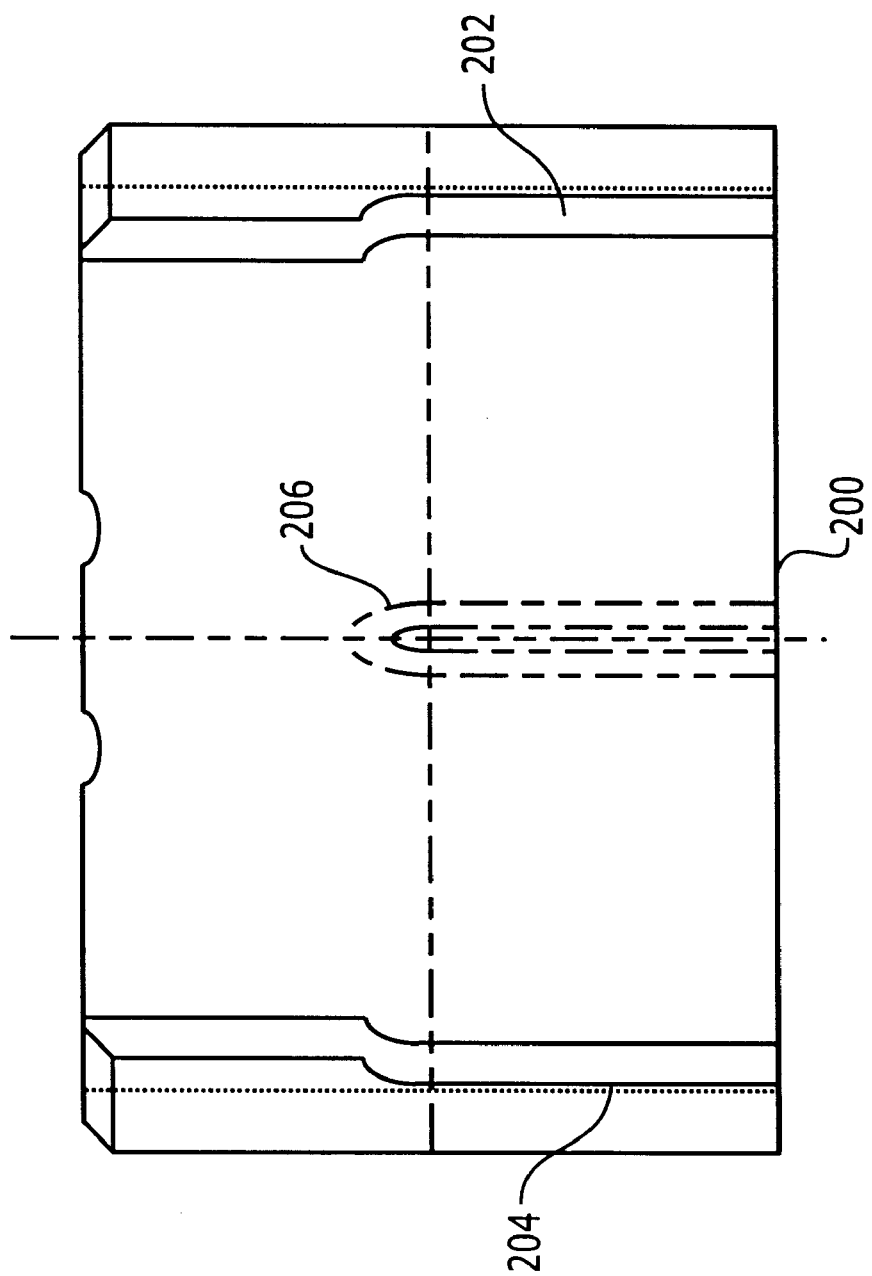

As can be seen in FIG. 2, and in greater detail in FIGS. 3A–3D, a clip ring 200 is provided surrounding at least a portion of the outside of the shaft 120 and providing an interference fit between the outer surface of the shaft and the inner surface of the stator. This clip ring 200 is pliable so that it can simply be fitted over the outer surface of the shaft after which it presses tightly against this outer surface of the shaft. As designed, it is intended to provide a means for both radially and axially locating the stator 129 relative to the shaft. To enhance this effect, upsets 202, 204 and 206 shown in greater detail in FIGS. 3B–3D are formed in the clip 200. The upsets at 202, 204 at the ends of the clip ring 200 can most simply be formed by bending the steel or equivalent material outwardly, away from the direction of curvature of the remainder of the clip, This bend is shown in enhanced, enlarged detail in FIG. 3B. The center upset 206 is also formed by bending the center section of material outward. This is shown in enhanced detail in FIG. 3C, as well as in FIG. 3D. The outer radius of the clip when pressed tightly against the shaft is only slightly less than the inner diameter of the stator so that the stator may be pressed/forced over the clip, creating a tight interference fit with the three protruding upsets. By providing these three upsets, the internal radius of the stator can still be slipped over the clip ring, and will press tightly against the interior surface of the stator and the upsets help maintain the radial and axial alignment of the stator with the rest of the motor. Further, since the stator is normally encapsulated in plastic, the upsets 202, 204, 206 are sufficiently sharp and press sharply against the interior surface of the stator with sufficient force to cut through the plastic and contact the laminations and provide a means for grounding the stator stack to the shaft 120.

The clip ring itself is accurately located within the shaft in the embodiment of FIG. 2 by providing a shoulder 210 on the shaft, preferably adjacent a recess 212 where the ring will rest. This both accurately locates the ring in a limited region of the shaft, and provides a shoulder against which both the clip ring 200 and the stator 129 can rest to be accurately located axially relative to the shaft. Thus when the motor is assembled, the magnet which is supported on the hub 100 and backiron 102 will inherently be accurately located relative to the stator, since it is accurately located axially relative to the shaft 120. Further details of portions of the assembly sequence as well as an alternative embodiment of the clip ring, appear in FIGS. 4A–4E.

Figure 4B:
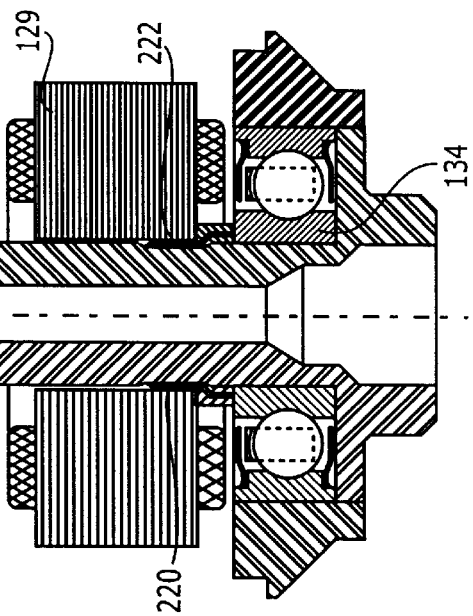
FIGS. 4A–4E are views showing details of an alternative embodiment of the grounding clip, both standing alone, and incorporated into a shaft/stator combination which would be useful in the motor of FIG. 2 or similar motors.
Figure 4A:
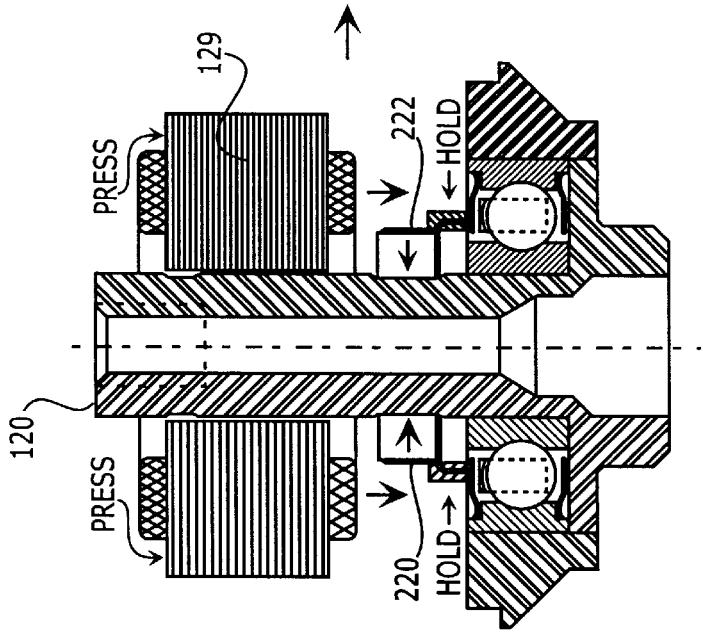
Figure 4C:
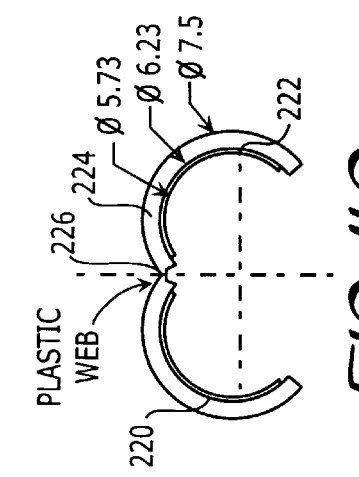

Referring to FIG. 4, this alternative approach comprises a two section steel clip ring, each of the sections 220, 222 which appear most clearly in FIG. 4C being formed of a relatively thin (for example about 0.25 mm thick) steel sheet or equivalent material which are insert molded into a pliable plastic spacer 224. The two sections are held together by a plastic web 226 incorporated into the plastic mold piece. Further, as clearly appear in FIG. 4D, the steel portion 220, 222 protrudes above the plastic molding 224 which is also wider than the steel. Thus, the clip ring can be placed around the shaft 120 as shown in FIG. 4A, and then the stator 129 is slipped over the shaft and over the clipped ring. The result as shown in FIG. 4B is that the inner diameter of the stator holds the clip ring closed; the axial location of the clip ring is fixed because it rests as in the previous embodiment in a recess in the shaft. The axial location is reinforced by the clip ring resting against the inner race of the bearing. In this embodiment, which could also be utilized with the embodiment of FIG. 2, the plastic insert has a greater radius when the clip is closed over the shaft than the steel which provides the interference fit and grounding. This positively establishes the axial location of the stator, as the end of the plastic insert 224 which is distant from the stator 129 can rest against, for example the inner race 134 of the bearing or a shoulder on the shaft. The design of FIGS. 4A–4D obviously requires fewer features on the shaft while still very accurately locating the stator relative to the shaft. Both designs prevent the stator from being located too close to the rotating seal region of the bearing, while isolating the stack from shaft vibrations. The plastic insert 224 is especially useful in this regard.

The same plurality of sharp features incorporated in the clip ring of FIG. 3A–3D can be provided on the clip ring of FIGS. 4A–4D to ensure the grounding of the stator to the shaft. To enhance the grounding, a metal plating on the stack inner diameter may be provided.

A set of exemplary dimensions for the design would provide that the stack inner diameter is 6.17±0.03 mm; the nickel plate thickness would be 0.006±0.0015 mm per side; the shaft OD=5.994±0.005; and the clip ring thickness 0.25 mm.

Figure 4D:
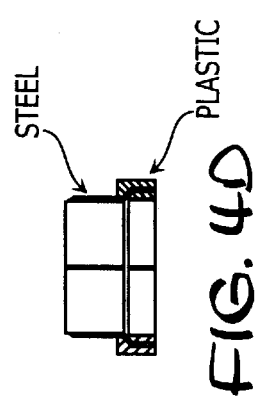
Figure 4E:

A further alternative to this design is shown in FIG. 4E, where the clip ring is again formed of all steel but incorporates the shoulder 244 which functions in the same way as the plastic ring shoulder 224 of FIG. 4D. This single piece which may be formed of all steel also includes an arm 246 which would rest on the feature of the shaft or inner race of the bearing in order to accurately locate the clip ring relative to the shaft and bearing.

Other features and advantages of the present invention may be apparent to a person of skill in the art who studies the present invention disclosure. Therefore, the scope of the present invention is to be limited only by the following claims.

What is claimed is:

1. In a spindle motor comprising a shaft and a hub rotating over said shaft supported by bearing means for rotation relative to said shaft, said hub supporting a magnet radially aligned with a stator supported from an outer surface of said shaft, a conductive clip ring surrounding a limited region of said shaft between said shaft and said stator and resting against either a fixed feature or recess on said shaft or an inner race of said bearing, said clip ring rigidly establishing an axial, radial and circumferential location of said stator relative to said shaft while grounding said stator to said shaft.

2. A clip ring as claimed in claim 1 including a plurality of upset features on an outer surface of said clip ring comprising means to enhance the frictional interference fit of said clip ring with said stator and said shaft.

3. A clip ring as claimed in claim 2 wherein one or more of said features have sharply defined edges facing radially outward from said clip ring, said stator having a plastic coating over a radially inner surface thereof, said plastic coating being penetrated by said sharp features to establish a grounding contact between said stator and said outer surface of said shaft.

4. A clip ring as claimed in claim 3 wherein said outer surface of said shaft includes a recess, said clip ring resting against an end of said recess to establish an axial location for said clip ring and thereby for said stator.

5. A clip ring as claimed in claim 3 further including a radially upraised shoulder adapted to rest between an axial surface of said stator and said feature or recess end on said shaft or said inner race of said bearing to further enhance the axial location of said stator relative to said shaft.

6. A clip ring as claimed in claim 5 further comprising a plastic molding surrounding a portion of a limited axial portion of said clip ring, said plastic molding defining said shoulder of said clip ring.

7. A clip ring as claimed in claim 6 wherein said plastic molding comprises a plastic web and said clip ring is formed of two separate semi-circular pieces each held by a portion of said plastic molding so that said clip ring may be opened and closed over said surface of said shaft.

8. A clip ring as claimed in claim 5 further including an arm extending radially from an end of said shoulder distant from said clip ring which intervenes between said stator and said shaft, said arm resting on an inner race of said bearing to axially locate said clip ring relative to said bearing and said shaft.

9. In a spindle motor comprising a shaft and a hub rotating over said shaft supported by bearing means for rotation relative to said shaft, said hub supporting a magnet radially aligned with a stator supported from an outer surface of said shaft, locating means supported from a feature on said shaft or said bearing for conductively and rigidly fixing the axial, radial and circumferential location of said stator relative to said shaft or said bearing while grounding said stator to said shaft.

10. A motor as claimed in claim 9 including a clip ring partially surrounding said shaft and having means to enhance the interference fit between said shaft and said stack.

\* \* \* \* \*